United States Patent [19]

Takagaki et al.

[11] Patent Number: 4,627,521
[45] Date of Patent: Dec. 9, 1986

[54] MOTOR AND BRAKE CONTROLS

[75] Inventors: Katsumi Takagaki, Urawa; Yukinori Ito, Kawagoe; Kiyohide Sumi, Koga, all of Japan

[73] Assignee: Fuji Jukogyo Kabushiki Kaisha, Tokyo, Japan

[21] Appl. No.: 618,114

[22] Filed: Jun. 7, 1984

[30] Foreign Application Priority Data

Jun. 28, 1983 [JP] Japan .................. 58-116611

[51] Int. Cl.⁴ ........................................... B60K 41/20
[52] U.S. Cl. ............................................................ 192/2
[58] Field of Search ............... 192/1, 2, 3 S, 3 M, 192/0.082, 0.094; 188/329, 330, 332; 56/10.5, 10.8, 11.3; 74/572

[56] References Cited

U.S. PATENT DOCUMENTS

| | | | |
|---|---|---|---|
| 2,525,946 | 10/1950 | Roberts | 74/572 X |
| 2,839,168 | 6/1958 | Cosper | 192/2 |
| 3,237,480 | 3/1966 | Phelon | 74/572 |
| 4,035,994 | 7/1977 | Hoff | 192/3 M |
| 4,394,893 | 7/1983 | Kronich et al. | 192/3 S |
| 4,419,857 | 12/1983 | Smith | 56/11.3 |
| 4,480,205 | 10/1984 | Nymann | 192/2 |
| 4,511,023 | 4/1985 | Nagai | 192/18 R |

Primary Examiner—George H. Krizmanich
Attorney, Agent, or Firm—Martin A. Farber

[57] ABSTRACT

A system for braking an engine is provided with a brake drum in the form of an annular projection formed on a side of a flywheel secured to a crankshaft of the engine. A pair of brake shoes are provided inside of the brake drum, and an end of each brake shoe is rotatably supported on a supporting plate. A spring is provided between the brake shoes to contract the shoes. A cam is rotatably provided on the supporting plate to be engaged with the other end of each brake shoe. A lever is connected to the cam and a spring is provided to urge the lever in the direction to expand the brake shoes. The lever is held by a brake operating device in the contracting state of the brake shoes.

9 Claims, 6 Drawing Figures

MOTOR AND BRAKE CONTROLS

BACKGROUND OF THE INVENTION

The present invention relates to an apparatus for braking the crankshaft of an engine when stopping of the operation of the engine.

In an engine for driving a rotary device such as a mower or tiller, an output shaft of an engine is directly coupled with a rotary body (such as a cutter blade, in the case of the mower) or coupled by way of a clutch mechanism. In either case, the rotary body continues to rotate for a while due to inertia even after stopping of the operation of the engine. In a conventional brake device for stopping the rotary body at the time of shutting off of the ignition system of the engine, a band brake is provided on a periphery of a flywheel magneto in an area corresponding to approximately 90 degrees.

When stopping the engine, the band brake is applied to the periphery of the flywheel. However, since the brake device applies the brake force against a magnet such as magnetic steel provided on the periphery of the flywheel, the wear of the magnetic steel increases the gap between a core of an ignition coil and the magnetic steel. On the other hand, heat generated during the brake application decreases the magnetism of the magnetic steel, resulting in a decrease of ignition performance.

Further, prior art concerns brake apparatus for engines. For example, Japanese utility model application laid open No. 56-160331 discloses a clutch brake apparatus. However, the apparatus requires an additional space for installation of the clutch and brake mechanisms, increasing the dimension of the machine in axial direction, and making the construction complicated. In addition, the apparatus is not applicable to a machine such as a mower having a construction allowing easy entrance of dust, sand, small stones, etc.

SUMMARY OF THE INVENTION

The object of the present invention is to provide an apparatus for braking an engine which eliminates the above described disadvantages of the prior art. According to the present invention, a brake device is provided inside of a flywheel, whereby the number of parts and manhours for the assembly of the apparatus may be reduced and the machine length in axial direction may be decreased. In addition, since the brake device is installed inside of the flywheel, above described disadvantages, can be avoided.

The other objects and features of this invention will be apparently understood from the following description with reference to the accompanying drawings.

DETAILED DESCRIPTION OF THE PREFERRED EMBODIMENT

Figure 4:
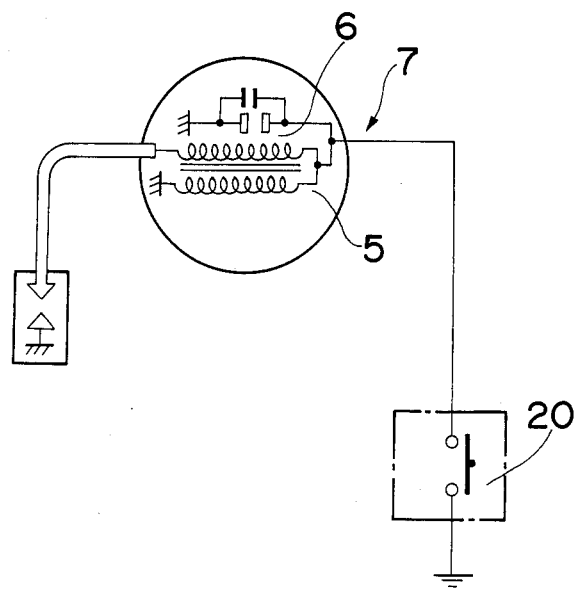
FIG. 4 is a circuit of an ignition system.

Referring to FIGS. 1-4, numeral 1 designates a crankcase of an engine, 2 is a crankshaft of the engine, and 3 is a flywheel secured to an end of the crankshaft 2. The flywheel functions also as a fan. Magnets 4 such as magnetic steel are provided on the periphery of the flywheel 3. An ignition system 7 comprising ignition coil 5 and contact breaker 6 shown in FIG. 4 is provided to form a flywheel magneto. A brake drum 8 is formed on the inside of the flywheel at the side confronting the crankcase 1. The brake drum is an annular projection, the inner circumference of which is adapted to serve as a braking surface.

A supporting plate 14 is secured to the crankcase 1 adjacent to the flywheel 3. A pair of brake shoes 10, each having a brake lining 11, are rotatably mounted on a shaft 9 secured to the supporting plate 14 and positioned in the inside of the brake drum 8. Between both brake shoes 10, a spring 12 is provided biasing the brake shoes inwardly of the drum 8, so that an abutment member 10a secured to an end of each brake shoe 10 is yieldably engaged with a cam 13. The cam 13 is rotatably supported by a bearing 16. Both sides of the cam 13 have beveled cam surfaces 13a so as to provide an easy adjustment of the stroke of the brake shoes. The cam 13 is connected with an end of a lever 17 while its other end is connected with a brake operating cable 18 connected to a manually operated brake operating device (not shown). Between the lever 17 and the supporting plate 14, an expansion spring 19 is provided to bias the lever 17 in the counter-clockwise direction to rotate such that the pair of the brake shoes 10 are opened. If a compression spring is employed instead of the expansion spring, the same effect can be attained by the reverse braking operation. A stop switch 20 is provided on the supporting plate 14 at a location where a switch lever 21 of the switch is operated by the lever 17. The stop switch 20 is provided so that the switch is turned on when the lever 17 moves the switch lever 21. As shown in FIG. 4, the switch 20 is provided between the primary wiring of the ignition coil 5 electrically connected with an ignition plug I and ground so as to excite the ignition coil 5 when the switch 20 is turned off.

Figure 1:
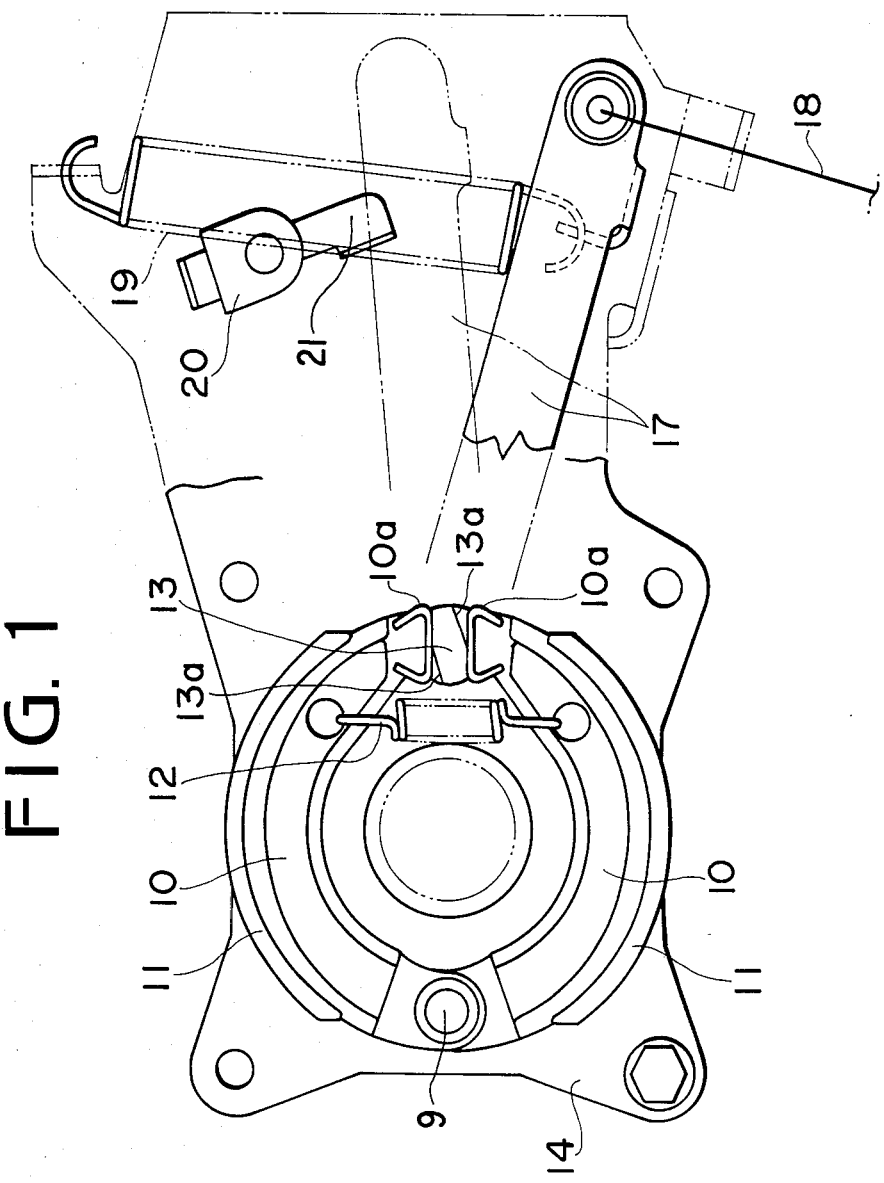
FIG. 1 is a plan view of a brake apparatus according to the present invention.
Figure 2:
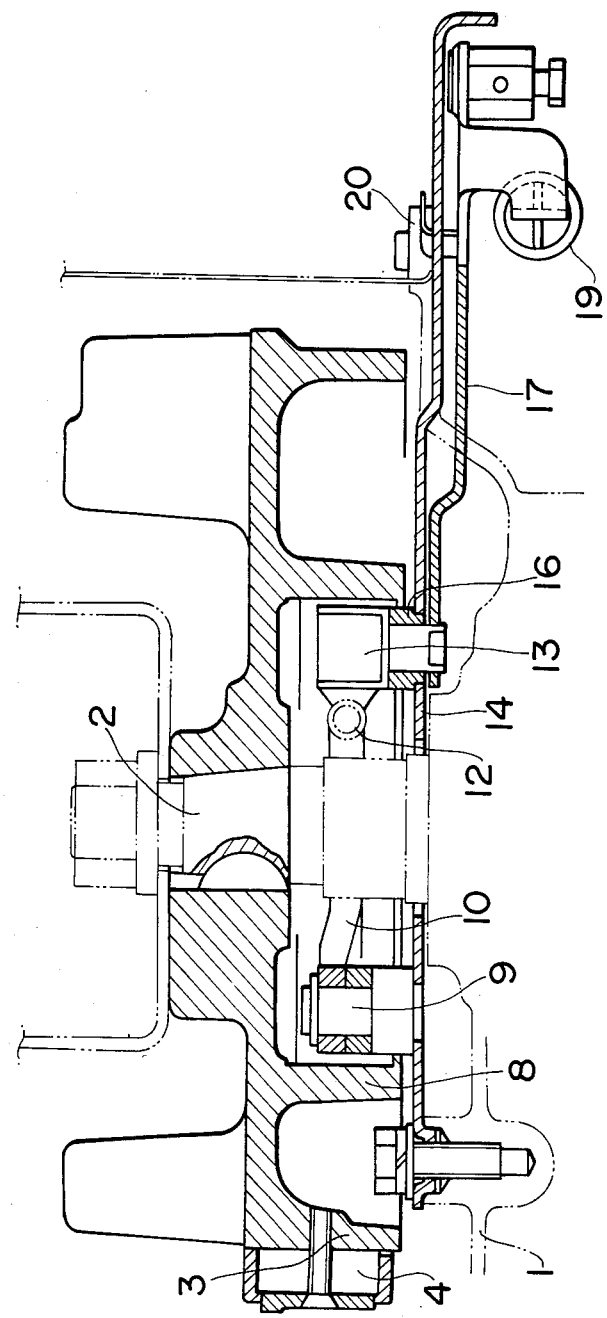
FIG. 2 is a sectional view of the apparatus of FIG. 1.
Figure 3:
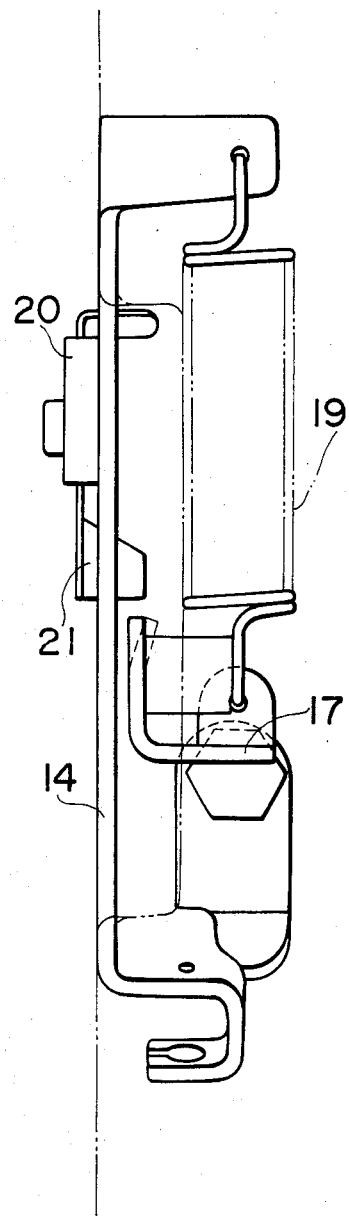
FIG. 3 is a side view of the apparatus.

In the condition shown by solid lines in FIG. 1, the lever 17 is kept at brake release position against the spring 19 by the cable 18 the end of which is connected to the brake operating device. Brake shoes 10 are held at contracted positions by the spring 12. The switch 20 is opened to operate the ignition system 7, so that the engine is in the operating state. When the cable 18 is released by operating the brake operating device, the lever 17 is rotated in the counterclockwise direction by spring 19. The cam 13 is rotated in the same direction as the lever 17, so that brake shoes 10 are expanded against the force of the spring 12. Thus, the brake shoes are applied to the inside surface of the drum 8, so that the flywheel 3 is braked to stop the crankshaft 2. On the other hand, the lever 17 operates switch lever 21 to close the switch 20. Thus, the ignition coil is grounded, thereby stopping the operation of the ignition system 7.

Figure 5:
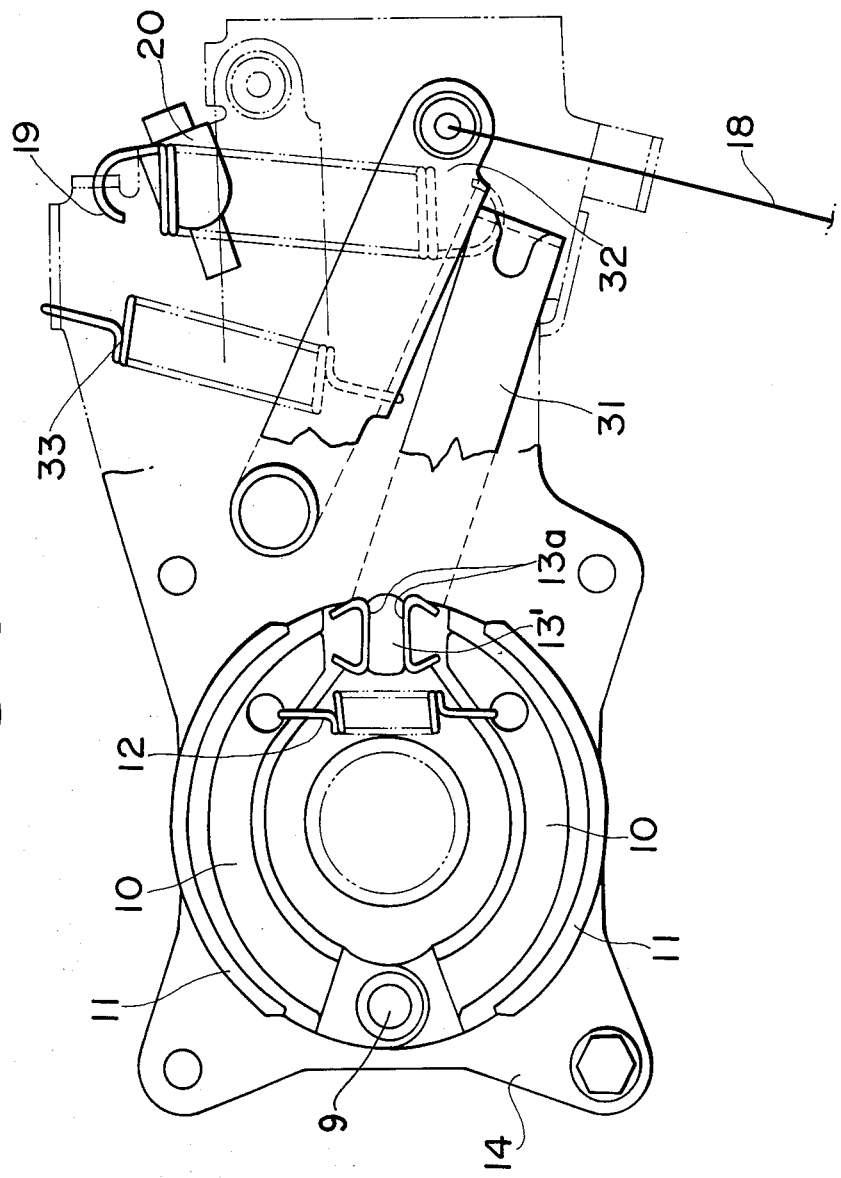
FIG. 5 is a plan view showing another embodiment of the present invention.
Figure 6:
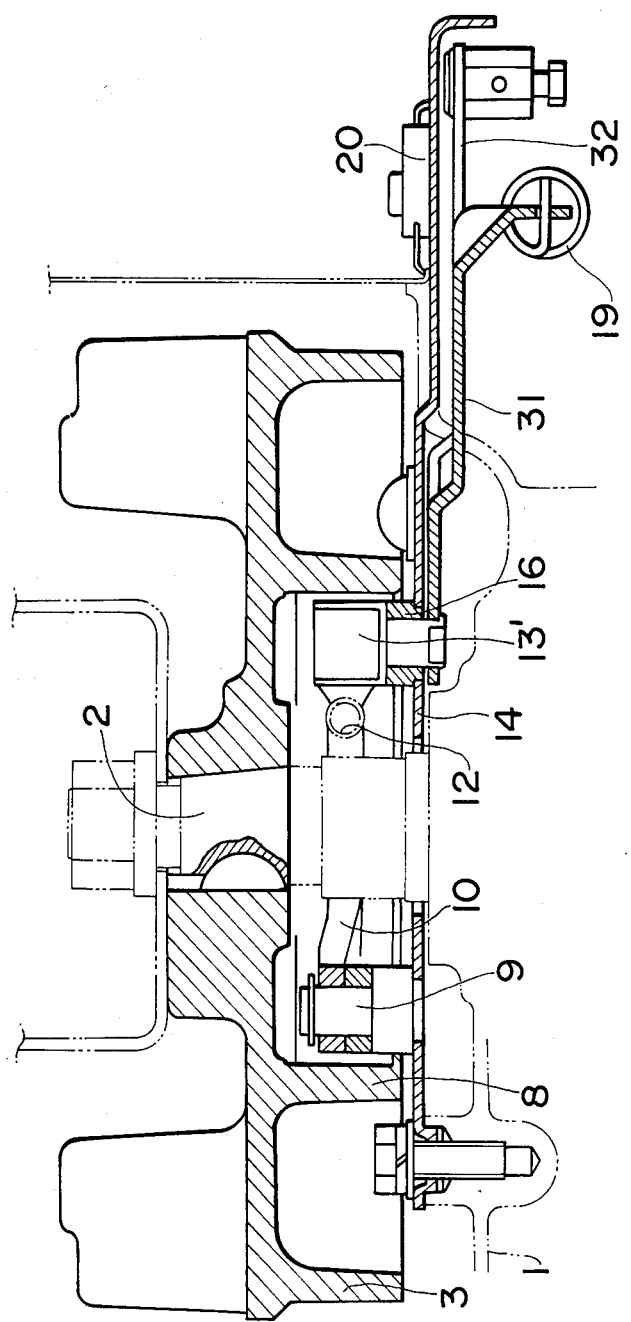
FIG. 6 is a sectional view of the apparatus of FIG. 5.

Another embodiment of present invention is explained with reference to FIGS. 5 and 6. This embodiment uses two operating levers 31 and 32 to actuate the cam 13'. An end of the first lever 31 is fixed to the cam 13' while spring 19 is provided between the other end of the first lever 31 and the supporting plate 14. An end of the second lever 32 is supported by the supporting plate 14 while the other end is connected with the brake operating device by the wire cable 18. Between the second lever 32 and the supporting plate 14, a return spring 33 is provided. FIG. 5 shows a brake apply state in which the cable 18 is pulled against the springs 19 and 33.

Other constructions and functions are the same as the first embodiment of the present invention. In the second embodiment, the brake operation stroke can be adjusted by adjusting the positions of the first and second levers 31 and 32. Accordingly, the cam 13' is not provided with beveled notches such as 13a in the first embodiment.

Although a rotating cam is employed as a part to expand a pair of brake shoes for braking in the above embodiments of the present invention, another actuating member such as a sliding member having inclined surfaces like a wedge can be employed.

From the foregoing, it will be understood that the present invention provides a break device which has the following advantages: a compact construction is provided without extending its dimension in the axial direction; the air gap is not increased since magnetic steel does not wear; the magnet steel is not demagnetized or its magnetism is not weakened since heat is not generated during braking; the crank shaft does not receive the bending force as the breaking force acts equally on the rear surface of the flywheel; in addition, any foreign materials such as dust, water, grass and sand are not allowed to enter inside the brake surfaces.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a motor and brake control device for an engine having a flywheel secured to a crankshaft of the engine so that the flywheel turns and respectively stops with turning and stopping respectively of the crankshaft, a crankcase, a flywheel magneto having magnetic steel at the periphery of the flywheel, the improvement comprising an annular brake drum formed on said flywheel having an inner circumference of said brake drum comprising a braking surface, a pair of expandable brake shoes engageable with the braking surface for stopping the flywheel, the crankshaft and the engine, an actuating member engaged with an end of each brake shoe, said actuating member being mounted movably so as to expand said brake shoes into engagement with the braking surface to brake said drum, a spring disposed between said shoes for biasing said shoes so that said end of each brake shoe engages said actuating member, switch means for shutting off the engine, a supporting plate secured to said crankcase axially adjacent to said flywheel and substantially perpendicular to the axis of the flywheel, said supporting plate constitutes means for supporting another end of each said brake shoe, one end of said actuating member, and said switch means such that the latter is operated by the actuating member by movement of the latter, and said actuating member, said brake shoes and said switch means being so arranged on said supporting plate adjacent said flywheel with a minimum axial length of the device providing a compact construction, said brake shoes being disposed inside said annular brake drum.

2. The device according to claim 1 wherein
said actuating member comprises a cam, at least one lever operatively connected to said cam, and spring means for biasing said lever to rotate the cam in the direction to expand said brake shoes.

3. The device according to claim 2 further comprising
brake operating means for holding said lever against the biasing force of said spring means holding said brake shoes in a contracting condition away from said braking surface.

4. The device according to claim 3 wherein
said brake operating means is a cable connected to said lever.

5. The device according to claim 2, wherein
said cam is secured to said lever,
first bearing means for pivotally mounting said cam to said supporting plate,
second bearing means for pivotally mounting said another end of each said brake shoes to said supporting plate,
said first and second bearing means are located adjacent said inner circumference of said annular brake drum and partly inside said annular brake drum.

6. The device according to claim 5, wherein
said at least one lever comprises a first lever secured to said lever and a second lever,
third bearing means, adjacent said annular brake drum, for pivotally mounting said second lever,
said spring means includes a return spring mounted between said supporting plate and said second lever and another spring biasing said first lever into engagement with said second lever,
means for holding and respectively releasing said second lever.

7. The device according to claim 1, wherein
said annular brake drum comprises an annular projection of the flywheel.

8. The device according to claim 7, wherein
said annular projection is radially inwardly spaced from the periphery of said flywheel.

9. In a motor and brake control device for an engine having a flywheel secured to a crankshaft of the engine so that the flywheel turns and respectively stops with turning and stopping respectively of the crankshaft, a crankcase, a flywheel magneto having magnetic steel at the periphery of the flywheel, the improvement comprising an annular brake drum formed on said flywheel having an inner circumference of said brake drum comprising a braking surface, a pair of expandable brake shoes engageable with the braking surface for stopping the flywheel, the crankshaft and the engine, an actuating member engaged with each said brake shoe and mounted movably so as to expand said brake shoes into engagement with the breaking surface to brake said drum, and a spring disposed between said shoes for biasing said shoes so that each said brake shoe engages said actuating member, switch means for shutting off the engine, a supporting plate secured to said crankcase axially adjacent to said flywheel and substantially perpendicular to the axis of the flywheel, said supporting plate constitutes means for supporting each said brake shoe, said actuating member, and said switch means arranged such that the latter is operated by the actuating member by movement of the latter, and said actuating member, said brake shoes and said switch means being so arranged on said supporting plate adjacent said flywheel with a minimum axial length of the device providing a compact construction, said brake shoes being disposed inside said annular brake drum.

* * * * *